US012639068B2

(12) United States Patent
Vinod

(10) Patent No.: US 12,639,068 B2
(45) Date of Patent: May 26, 2026

(54) METHODS AND SYSTEMS FOR AUTOMATED APPLICATION DEVELOPMENT

(71) Applicant: Babu Vinod, Palo Alto, CA (US)

(72) Inventor: Babu Vinod, Palo Alto, CA (US)

( * ) Notice: Subject to any disclaimer, the term of this patent is extended or adjusted under 35 U.S.C. 154(b) by 206 days.

(21) Appl. No.: 18/142,573

(22) Filed: May 2, 2023

(65) Prior Publication Data

US 2024/0118889 A1 Apr. 11, 2024

Related U.S. Application Data

(60) Provisional application No. 63/337,499, filed on May 2, 2022.

(51) Int. Cl.
*G06F 8/77* (2018.01)
(52) U.S. Cl.
CPC ...................................... *G06F 8/77* (2013.01)
(58) Field of Classification Search
CPC .......................................................... G06F 8/77
See application file for complete search history.

(56) References Cited

U.S. PATENT DOCUMENTS

| | | | |
|---|---|---|---|
| 11,379,484 B1 * | 7/2022 | Colomban | .......... H04L 65/4015 |
| 11,650,834 B1 * | 5/2023 | Varada | .................... G06F 9/453 |
| | | | 717/104 |
| 11,709,686 B1 * | 7/2023 | Wehrman | .............. G06F 16/955 |
| | | | 715/246 |
| 11,947,946 B1 * | 4/2024 | Rao | ........................ G06N 20/20 |
| 2022/0147225 A1 * | 5/2022 | Freisthler et al. | .... G06F 3/0481 |
| 2023/0135858 A1 * | 5/2023 | St. Clair | ............... G06F 16/583 |
| | | | 709/231 |
| 2023/0254438 A1 * | 8/2023 | Sherman | ............... G06T 19/006 |
| | | | 348/239 |

\* cited by examiner

*Primary Examiner* — Wei Y Mui

(57) ABSTRACT

In one aspect, a computerized method for automated application development comprising: obtaining a plurality of raw data of one or more user conference call regarding the development of an application; converting the plurality of raw data to a computer readable format; and analyzing a content of the computer readable format for actionable material related to an application attribute and an application functionality.

6 Claims, 4 Drawing Sheets

OBTAIN RAW DATA OF ONE OR MORE USER CONFERENCE CALL REGARDING THE DEVELOPMENT OF AN APPLICATION
102

CONVERT OUTPUT OF STEP 102 TO A COMPUTER READABLE FORMAT
104

ANALYZE CONTENT FOR ACTIONABLE MATERIAL RELATED TO APPLICATION ATTRIBUTES AND/OR FUNCTIONALITIES
106

100

METHODS AND SYSTEMS FOR AUTOMATED APPLICATION DEVELOPMENT

CLAIM OF PRIORITY

This application claims priority to U.S. Provisional Patent Application No. 63/337,499, filed on 2 May 2022 and titled METHODS AND SYSTEMS FOR AUTOMATED APPLICATION DEVELOPMENT. The provisional patent application is hereby incorporated by reference in its entirety.

BACKGROUND

Employees of a company can have conference calls to discuss development of an application. The employees can draw out various application attributes and functions on a whiteboard (e.g. physical and/or virtual whiteboard). However, in order to implement application development, the employees then need to manually convert the white board material, meeting notes, etc. into a format for an application developer to then use to manually build the application. Accordingly, computerized tools are needed to automate the collection of the information, the formatting of the information and the automated generation of the application (e.g. at least in a prototype form).

SUMMARY OF THE INVENTION

In one aspect, a computerized method for automated application development comprising: obtaining a plurality of raw data of one or more user conference calls regarding the development of an application; converting the plurality of raw data to a computer readable format; and analyzing a content of the computer readable format for actionable material related to an application attribute and an application functionality.

Figure 1:
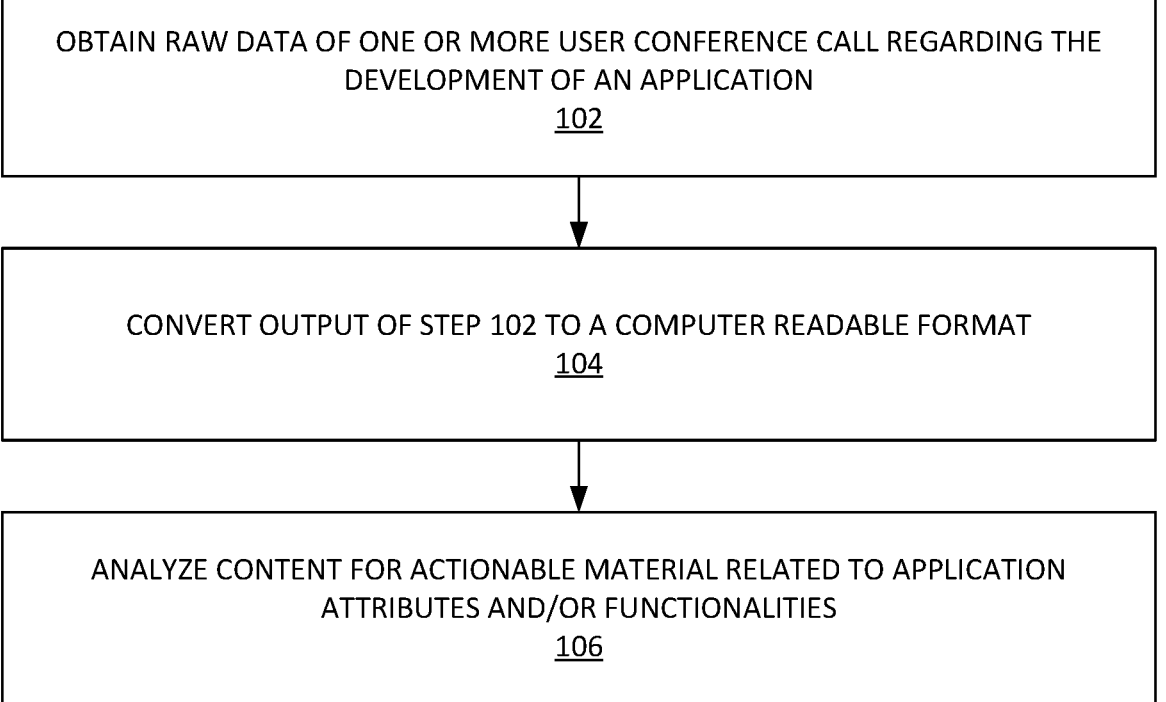
FIG. 1 illustrates an example process used for automated application development, according to some embodiments.

The Figures described above are a representative set and are not an exhaustive with respect to embodying the invention.

DESCRIPTION

Disclosed are a system, method, and article of manufacture for automated application development. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment'; 'an embodiment,' 'one example,' or similar language means that a particular feature, structure, or characteristic described in connection with the embodiment is included in at least one embodiment, according to some embodiments. Thus, appearances of the phrases 'in one embodiment'; 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application program is a computer program designed to carry out a specific task other than one relating to the operation of the computer itself, typically to be used by end-users.

App (application) store (e.g. an app marketplace) is a type of digital distribution platform for computer software called applications, often in a mobile context. Apps provide a specific set of functions which, by definition, do not include the running of the computer itself. Complex software designed for use on a personal computer, for example, may have a related app designed for use on a mobile device. Apps can be normally designed to run on a specific operating system—such as the contemporary iOS, macOS, Windows or Android—but in the past mobile carriers had their own portals for apps and related media content.

Deep learning is part of a broader family of machine learning methods based on artificial neural networks with representation learning. Learning can be supervised, semi-supervised or unsupervised.

Deep neural network (DNN) is an artificial neural network (ANN) with multiple layers between the input and output layers. There are different types of neural networks, but they always consist of the same components: neurons, synapses, weights, biases, and functions.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, logistic regression, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Natural language processing (NLP) is a branch of artificial intelligence concerned with automated interpretation and generation of human language. Natural language processing (NLP) is an interdisciplinary subfield of linguistics, computer science, and artificial intelligence concerned with the interactions between computers and human language, in particular how to program computers to process and analyze large amounts of natural language data. The goal is a computer capable of "understanding" the contents of documents, including the contextual nuances of the language within them. The technology can then accurately extract information and insights contained in the documents as well as categorize and organize the documents themselves. Challenges in natural language processing frequently involve speech recognition, natural-language understanding, and natural-language generation.

Optical character recognition or optical character reader (OCR) is the electronic or mechanical conversion of images of typed, handwritten, or printed text into machine-encoded text, whether from a scanned document, a photo of a document, a scene-photo and/or from subtitle text superimposed on an image.

These systems and functions can be incorporated into various embodiments discussed herein.

Example Systems and Methods

FIG. 1 illustrates an example process 100 used for automated application development, according to some embodiments. In step 102, process 100 can obtain raw data of one or more user conference calls regarding the development of an application. This can include, inter alia, digital white board data, digital images of a physical white board, digital audio recordings of a conference call when an application development was discussed, memos/emails about the digital application, etc.

In step 104, process 100 can convert output of step 102 to a computer readable format. This step can include OCR steps, NLP steps, speech to text steps, etc.

In step 106, process 100 can analyze content for actionable material related to application attributes and/or functionalities. For example, key terms and phrases can be used to identify when users are discussing application attributes (e.g. color, design, input, output, etc.) of an application in development. Key terms and phrases can be used to identify when users are discussing application functionalities (e.g. geolocation, geo-tracking, gaming, photo editing, texting, invoicing, banking, e-commerce, mathematical calculations, etc.). Process 100 can identify the attributes and functionalities to include in the application. It is noted that users can explicitly state/input attributes and functionalities to include as well.

Figure 2:
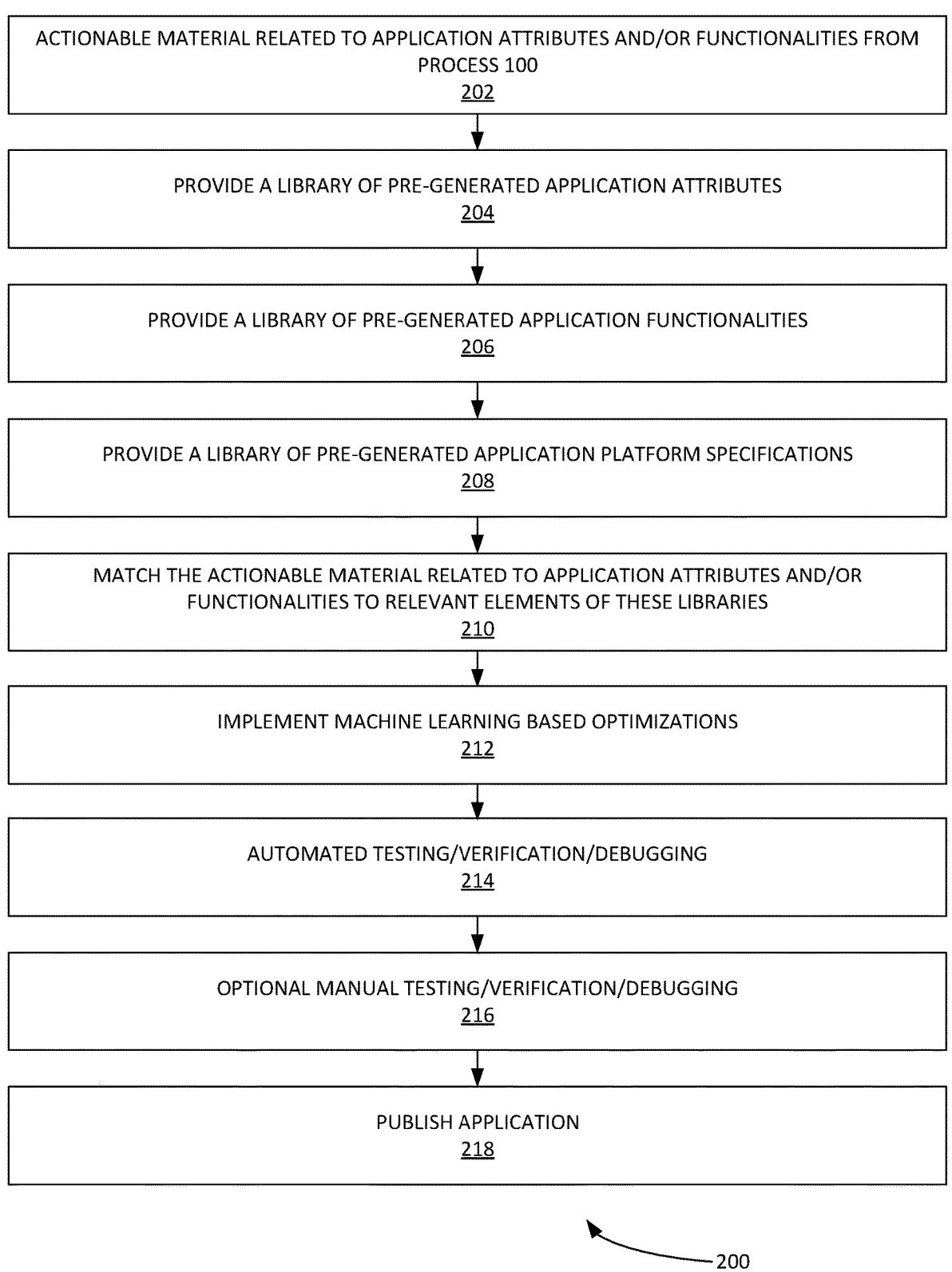
FIG. 2 illustrates another example process used for automated application development, according to some embodiments.

FIG. 2 illustrates another example process 200 used for automated application development, according to some embodiments. Process 200 can be a continuation of process 100. Processes 100 and 200 can be implemented by systems 300 and 400 discussed infra.

In step 202, process 200 can obtained actionable material related to application attributes and/or functionalities from process 100.

In step 204, process 200 can provide a library of pre generated application attributes. In step 206, process 200 can provide a library of pre generated application functionalities. In step 208, process 200 can provide a library of pre-generated application platform specifications. In step 210, process 200 can match the actionable material related to application attributes and/or functionalities to relevant elements of these libraries. These libraries can be stored in application development libraries 314 of FIG. 3 infra.

In step 212, process 200 can implement automated testing/verification/debugging steps. In step 214, process 200 can implement optional manual testing/verification/debugging. In step 216, process 200 can implement machine learning based optimizations. In step 218, process 200 can publish the application (e.g. to an application store, to an enterprise network, etc.).

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alio: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naïve Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset. Processes 100 and 200 can take an idea and convert to a set of application on the fly. In some examples, applications can be created on the fly during the conference call while the users discuss it. In this way, users can iterate through various versions of the application and/or debug in real time (e.g. assuming networking and processing latencies, etc.). In this way, a conference call can be converted into a functioning application.

It is noted that a hierarchy of participants can be utilized (e.g. based on employment position, technical experience, etc.) where an automated application development process takes user contributions and applies them based on status of who suggests the contribution.

Example Automated Application Development System

Figure 3:
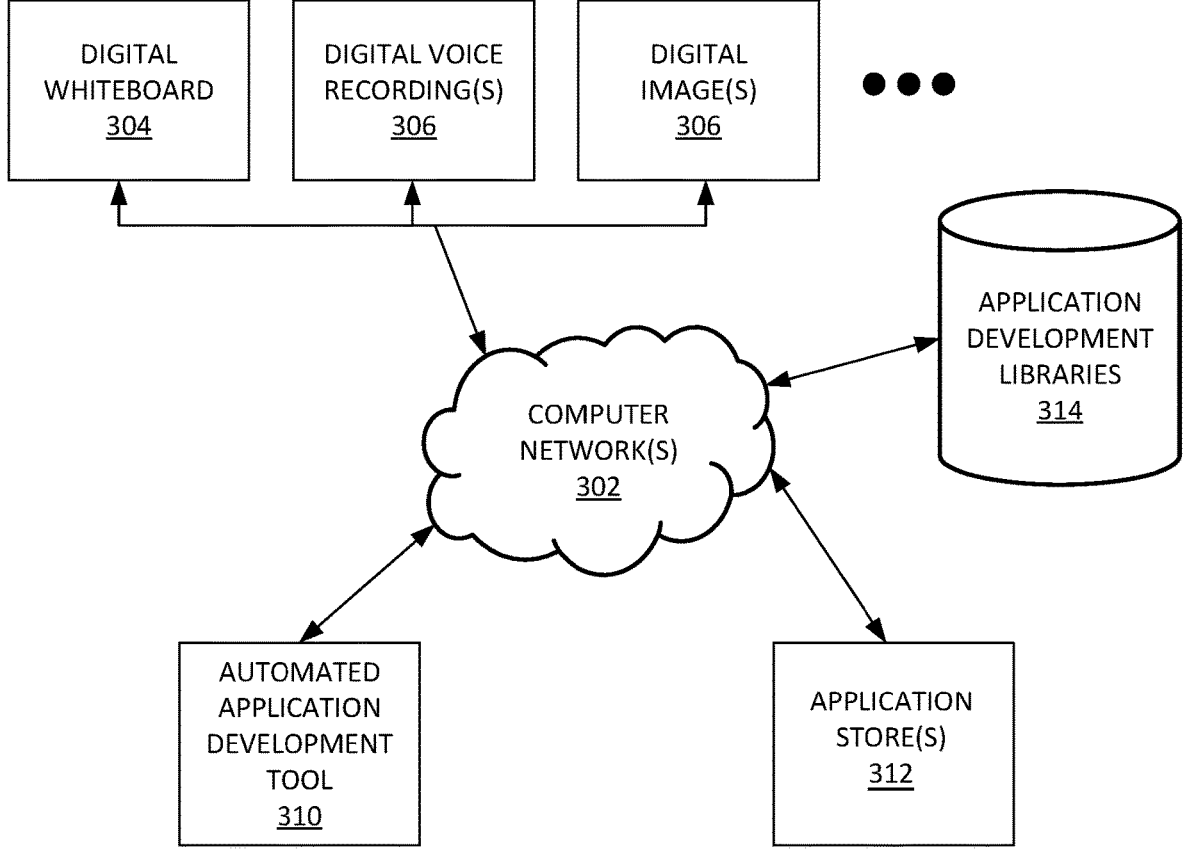
FIG. 3 illustrates an example automated application development system, according to some embodiments.

FIG. 3 illustrates an example automated application development system 300, according to some embodiments. System 300 can include digital whiteboard 304, digital voice recording(s), 306 digital image(s) 306, etc. Digital whiteboard 304, digital voice recording(s), 306 digital image(s) 306 can provide information to automated application development tool 310 via computer network(s) 302. Automated application development tool 310 implement processes 100 and 200. Automated application development tool 310 can include various functionalities such as, inter alia: OCR, NLP, databases, application editing tools, application design editors, ML/AI development systems, etc. Automated application development tool 310 can use $3^{rd}$ party systems as well (e.g. geolocation systems, geofencing system, geomapping systems, multimedia databases, language databases, e-commerce servers, etc.).

Application development libraries 314 can be maintained based on the types of application designs, attributes, and functionalities that an enterprise may need/use. Application development libraries 314 can include various application templates. Application development libraries 314 can include pre-generated and tested/debugged functionalities/attributes. In this way, functionalities/attributes are able of being automatically integrated into the application merely based on the analysis of the input into process 100. Applications generated by system 300 can be published to application store(s) 312. Application store(s) 312 can be proprietary within the enterprise (e.g. only available to employees, etc.) and/or public app stores.

Additional Example Computer Architecture and Systems

Figure 4:
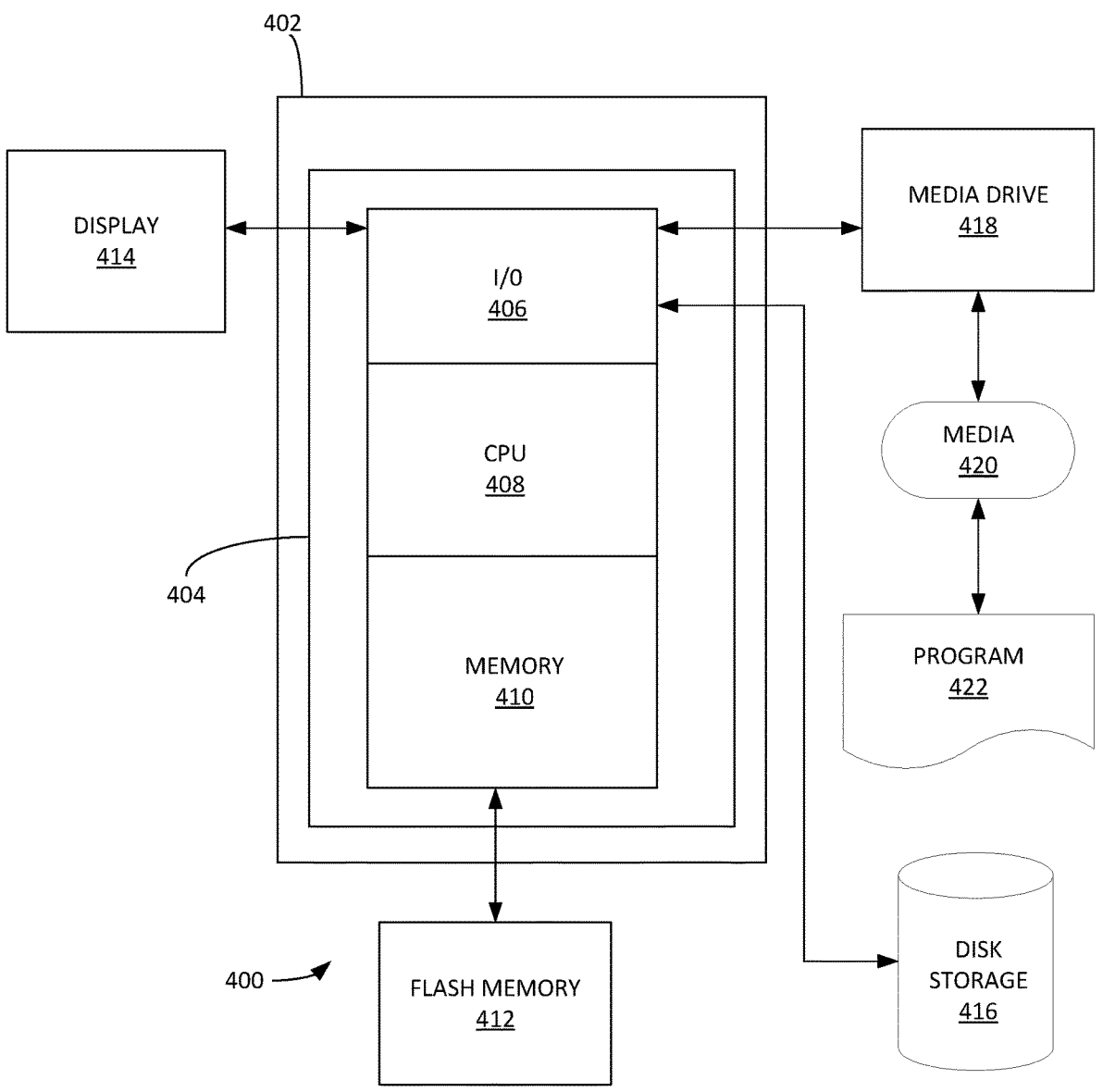
FIG. 4 is a block diagram of a sample computing environment that can be utilized to implement various embodiments.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for automated application development comprising:

obtaining a plurality of raw data from at least one user conference call regarding the development of an application, the plurality of raw data comprising digital whiteboard data, digital images of a physical whiteboard, and digital audio recordings of the at least one user conference call;

converting the plurality of raw data to a computer-readable format;

analyzing a content of the computer-readable format for actionable material related to at least one application attribute and at least one application functionality;

obtaining the actionable material from the content of the computer-readable format, wherein the actionable material is related to the at least one application attribute and the at least one application functionality and is relevant to a library of pre-generated application attributes, a library of pre-generated application functionalities, and a library of pre-generated application-platform specifications;

matching the actionable material to one or more relevant elements of the library of pre-generated application attributes, the library of pre-generated application functionalities, and the library of pre-generated application-platform specifications stored in an application-development library;

automatically generating, with the library of pre-generated application attributes, the library of pre-generated application functionalities, and the library of pre-generated application-platform specifications, an application;

automatically implementing a plurality of automated testing, verification, and debugging operations on the application;

implementing a plurality of manual testing, verification, and debugging operations on the application;

using a plurality of machine-learning-based optimizations to improve the application;

and publishing the application to at least one of an online application store or an enterprise network;

wherein the actionable material comprises a plurality of key terms and phrases used to identify when users are discussing the at least one application attribute or the at least one application functionality, wherein the application is iteratively generated or updated during the user conference call while the plurality of raw data is being obtained, thereby enabling real-time prototyping and debugging, and wherein the analyzing of the content of the computer-readable format further comprises weighting the actionable material according to a hierarchy of participants defined by at least one of an employment position or a technical expertise level of each participant.

2. The computerized method of claim 1, wherein the application is automatically published to an online application store.

3. The computerized method of claim 1, wherein the application is automatically published to an enterprise network.

4. The computerized method of claim 1, wherein the plurality of raw data comprises digital audio recordings of the at least one user conference call.

5. The computerized method of claim 1, wherein the actionable material related to the at least one application attribute and the at least one application functionality comprises a plurality of key terms and phrases used to identify when users are discussing the at least one application functionality.

6. The computerized method of claim 1, wherein the actionable material related to the at least one application attribute and the at least one application functionality comprises a plurality of explicit statements by a caller regarding the at least one application attribute or the at least one application functionality.

* * * * *